United States Patent
Li et al.

(10) Patent No.: US 11,474,651 B1
(45) Date of Patent: Oct. 18, 2022

(54) TOUCH SENSOR AND DISPLAY DEVICE INCLUDING SAME

(71) Applicant: FlexTouch Technologies Co., Ltd., JiaXing (CN)

(72) Inventors: Yanshu Li, Sunnyvale, CA (US); Esat Yilmaz, Santa Cruz, CA (US); Jonathan Jianguo Jiang, Saratoga, CA (US)

(73) Assignee: FlexTouch Technologies Co., Ltd., Zhejiang (CN)

( * ) Notice: Subject to any disclaimer, the term of this patent is extended or adjusted under 35 U.S.C. 154(b) by 0 days.

(21) Appl. No.: 17/388,405

(22) Filed: Jul. 29, 2021

(30) Foreign Application Priority Data

Jul. 13, 2021 (CN) .......................... 202110791766.6

(51) Int. Cl.
*G06F 3/044* (2006.01)

(52) U.S. Cl.
CPC .. *G06F 3/0443* (2019.05); *G06F 2203/04112* (2013.01)

(58) Field of Classification Search
None
See application file for complete search history.

(56) References Cited

U.S. PATENT DOCUMENTS

| 11,397,492 B2* | 7/2022 | Derichs | G06F 3/0446 |
| 2017/0091903 A1* | 3/2017 | Jo | G09G 3/3233 |
| 2021/0083036 A1* | 3/2021 | Kang | H01L 51/5281 |

FOREIGN PATENT DOCUMENTS

| CN | 104793782 A | 7/2015 |
| CN | 112968046 A | 6/2021 |

OTHER PUBLICATIONS

First Office Action for Chinese Patent Application No. 202110791766.6 dated Mar. 3, 2022.

* cited by examiner

*Primary Examiner* — Duane N Taylor, Jr.
(74) *Attorney, Agent, or Firm* — McDonnell Boehnen Hulbert & Berghoff LLP (57) ABSTRACT

Disclosed is a touch sensor, and a display device including the same. The touch sensor for a Delta arrangement of subpixels comprises a first group of conductive lines extending parallelly along an oblique direction with respect to the Delta arrangement of subpixels, the first group of conductive lines comprising first conductive lines and second conductive lines arranged alternately, the first conductive lines arranged at a same first pitch as the second conductive lines and deviated from the second conductive lines so as to homogenize the occlusions of the Delta arrangement of subpixels.

10 Claims, 7 Drawing Sheets

TOUCH SENSOR AND DISPLAY DEVICE INCLUDING SAME

TECHNICAL FIELD

The present disclosure generally relates to touch sensing, in particular to a touch sensor for moiré mitigation in a display device with a Delta arrangement of subpixels and to a display device including the touch sensor.

BACKGROUND

According to an example scenario, a touch sensor detects the presence and position of an object (e.g., a user's finger or a stylus) within a touch-sensitive area of the touch sensor array overlaid on a display screen, for example. In a touch sensitive display application, a touch sensor array allows a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other device. A control panel on a household or other appliance may include a touch sensor.

There are a number of different types of touch sensors, such as for example resistive touch sensors, surface acoustic wave touch sensors, and capacitive touch sensors. In one example, when an object physically touches a touch screen within a touch sensitive area of a touch sensor of the touch screen (e.g., by physically touching a cover layer overlaying a touch sensor array of the touch sensor) or comes within a detection distance of the touch sensor (e.g., by hovering above the cover layer overlaying the touch sensor array of the touch sensor), a change in capacitance may occur within the touch screen at a position of the touch sensor of the touch screen that corresponds to the position of the object within the touch sensitive area of the touch sensor. A touch sensor controller processes the change in capacitance to determine the position of the change of capacitance within the touch sensor (e.g., within a touch sensor array of the touch sensor).

Optical interaction of mesh pattern touch sensors and optical display devices may result in appearance of one or more moiré-pattern effects. A moiré pattern may refer to a secondary and visually evident superimposed pattern that can result from a touch-sensor repeated/periodic mesh pattern being overlaid over a repeating pixel pattern of a display device. The appearance of a moiré-pattern effect may be caused by one or more features of a touch sensor that cause perceivable differences in the intensity of light and color from the display.

In one example, a touch-sensor mesh pattern, at least in part, changes the intensity of perceivable light and color of a display and thereby causes a moiré-pattern effect to appear when the touch sensor and display are used in combination. More specifically, a mesh pattern including a repeating pattern of conductive lines are superimposed onto a repeating pattern of pixels or subpixels of the display, and, in one example, the superimposition of the mesh pattern on the display results in various conductive lines of the mesh pattern passing over and/or through at least some portion of one or more subpixels of the display. The superimposition of conductive lines, including opaque or semi-opaque materials for example, over the display elements can obstruct or occlude light from the pixels beneath the conductive lines. When the mesh pattern and the pixels of the display are constructed according to regular patterns, for example, the pattern of obstructed light caused by the conductive lines can result in a visible and/or noticeable pattern to a user viewing the display. To illustrate, particular pixels or subpixels may be intersected by longer and/or shorter sections of the conductive lines, which can result in particular pixels or subpixels intersected by shorter lengths of conductive lines resulting in less occlusion (i.e., the pixel or subpixel will be brighter), while other pixels or subpixels are intersected by longer sections of the conductive lines resulting in more occlusion (i.e., the pixels or subpixels will be dimmer) and other pixels or subpixels are not intersected by a conductive line at all and thus are not occluded. In one example, the repeating nature of conductive lines and pixels results in particular frequencies associated with the pixels having similar occlusion levels. In one example, unequal occlusion of subpixels within a pixel results in change of viewed/perceived color with respect to the expected color emitted by the pixel.

Several approaches have been proposed to mitigate the moiré-pattern effects, while most of those approaches are directed at or designed for display devices with conventional subpixel arrangements, such as a so-called Stripe arrangement (e.g., RGB stripe arrangement) in which subpixels are arranged in rows and columns to have a specific order of three subpixels of different colors (e.g., red, green and blue) repeated along each row (or column) with sub-pixels of the same color arranged in each column (or row) in many cases. As an example, US20170131810A1 proposes optimized spatial frequencies and directions of periodicity of touch sensor meshes in order to minimize the perceptible moiré effects that would otherwise interfere with display images, while merely directing at the so-called Stripe arrangement of subpixels. A display device (such as organic electroluminescence (EL) display) with a so-called Delta arrangement of subpixels, in which subpixels are arranged in rows (or columns) to have a specific order of three subpixels of different colors (e.g., red, green and blue) repeated at a regular interval along each row (or column) with every two adjacent rows (or columns) misaligned from each other by half the regular interval in the row (or column) direction such that pixel units, each of which consists of three subpixels of different colors (e.g., red, green and blue) respectively located at three vertices of a triangle therein, can be defined in many cases has become popular in recent years, but the inventors have found that those existing approaches including the one disclosed in US20170131810A1 are not capable of effectively mitigating moiré pattern effects occurring in a display device with the so-called Delta arrangement of subpixels.

SUMMARY

This summary is provided to introduce a selection of concepts in a simplified form that are further described below in the Detailed Description. This summary is not intended to identify key features or essential features of the claimed subject matter. Furthermore, the claimed subject matter is not limited to implementations that solve any or all disadvantages noted in any part of this disclosure.

The present disclosure aims to provide a touch sensor for mitigating moiré generated by the interaction of the mesh pattern with a Delta arrangement of subpixels and a display device including the touch sensor.

One aspect of the present disclosure provides a touch sensor for a display device, the display device comprising a pixel array on which the touch sensor is overlaid when viewed from a front side of the display device, the pixel array comprising a plurality of subpixel units substantially arranged into a plurality of subpixel rows arranged at a first interval in a first direction, wherein each subpixel row extends along a second direction perpendicular to the first direction to have an order of three subpixels of different colors repeated at a second interval, and every two adjacent subpixel rows are misaligned with respect to each other by half the second interval in the second direction, wherein the touch sensor comprises at least one layer of electrodes comprising a first group of conductive lines extending parallelly along a third direction oblique to the first direction by a first acute angle, the first group of conductive lines comprising first conductive lines and second conductive lines arranged alternately, the first conductive lines arranged at a same first pitch along the first direction as the second conductive lines and deviated from the second conductive lines by a first offset in the first direction, wherein the first offset is defined by $$O1 = (2a-1)*I1 + \frac{I2}{2}*\cot A1,$$

wherein O1 denotes the first offset, a denotes an integer greater than 0, I1 denotes the first interval, I2 denotes the second interval, and A1 denotes the first acute angle.

Another aspect of the present disclosure provides a display device including a touch sensor as described above.

Other aspects and features of the present disclosure will become apparent, to those ordinarily skilled in the art, upon review of the following description of the specific examples of the specification.

BRIEF DESCRIPTION OF DRAWINGS

The figures depict one or more implementations in accordance with the present teachings, by way of example only, not by way of limitation. In the figures, like reference numerals refer to the same or similar elements.

DETAILED DESCRIPTION OF THE INVENTION

Hereinafter, a touch sensor according to the present disclosure will be described in detail based on exemplary embodiments shown in the accompanying drawings.

Figure 1A:
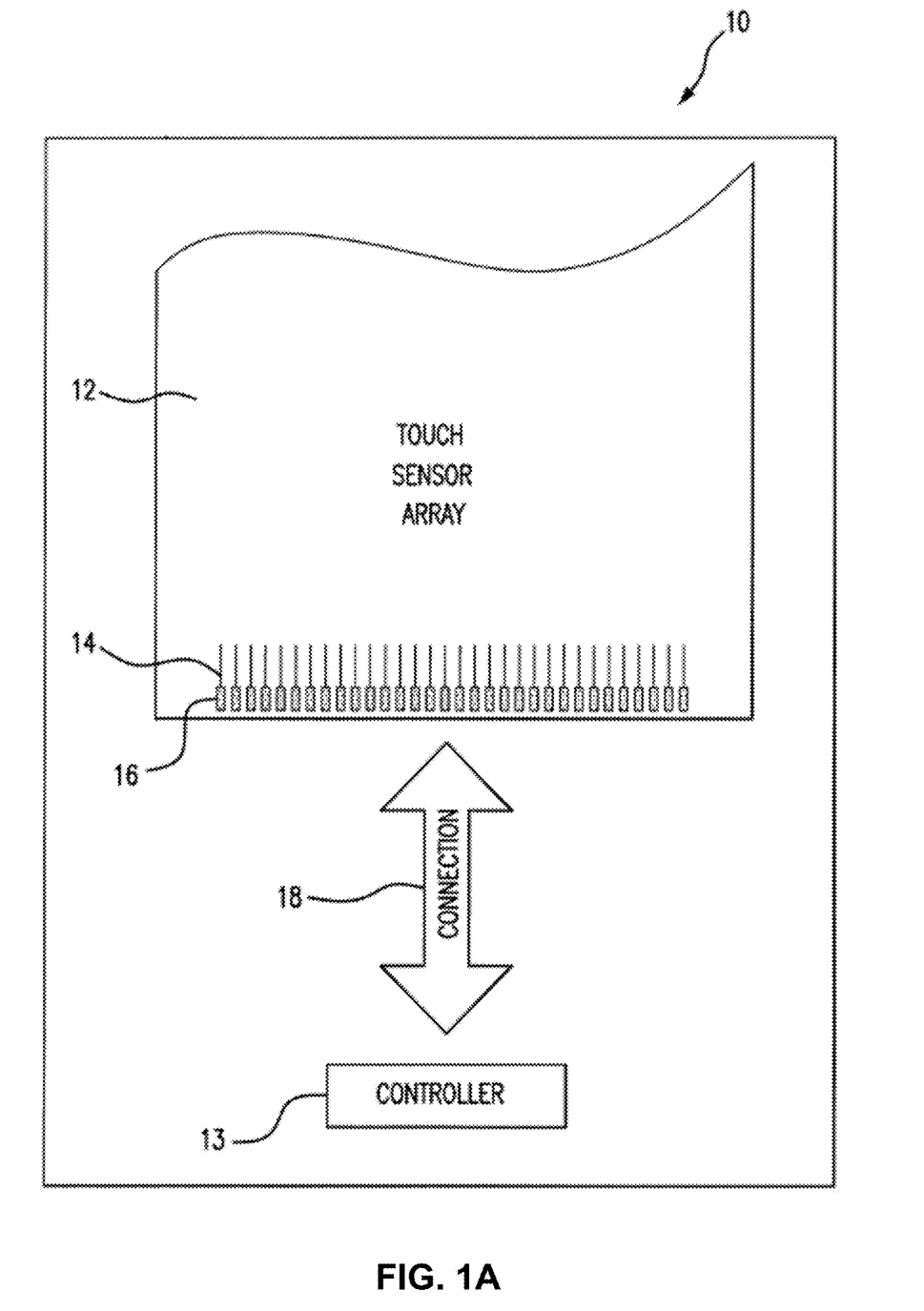
FIG. 1A illustrates an example touch sensor in accordance with particular embodiments.

FIG. 1A illustrates an example touch sensor 10 in accordance with particular embodiments. Touch sensor 10 includes touch sensor array 12 and touch sensor controller 13. Touch sensor array 12 and touch sensor controller 13 may detect the presence and position of a touch or the proximity of an object within a touch-sensitive area of touch sensor array 12.

Touch sensor array 12 may include one or more touch-sensitive areas. Touch sensor array 12 may include an array of electrodes disposed on one or more substrates, which may be made of a dielectric material.

An electrode may be an area of conductive material forming a shape, such as for example a disc, square, rectangle, thin line, other suitable shape, or suitable combination of these shapes. One or more cuts in one or more layers of conductive material may (at least in part) create the shape of an electrode, and the area of the shape is (at least in part) bounded by those cuts. An electrode may be made of fine lines of metal or other conductive material (such as for example copper, silver, or a copper- or silver-based material) and the fine lines of conductive material may occupy substantially less than 100% (such as for example, approximately 5%) of the area of its shape in a hatched, mesh, or other pattern. For example, one or more portions of the conductive material may be copper or copper-based and have a thickness of approximately 5 microns (μm) or less and a width of approximately 10 μm or less. As another example, one or more portions of the conductive material may be silver or silver-based and similarly have a thickness of approximately 5 μm or less and a width of approximately 10 μm or less. This disclosure contemplates any electrodes made of any electrically-conductive materials. Although this disclosure describes or illustrates particular electrodes made of particular conductive material forming particular shapes with particular fill percentages having particular patterns, this disclosure contemplates, in any combination, electrodes made of other conductive materials forming other shapes with other fill percentages having other patterns.

The shapes of the electrodes (or other elements) of a touch sensor array 12 constitute, in whole or in part, one or more macro-features of touch sensor array 12. One or more characteristics of the implementation of those shapes (such as, for example, the conductive materials, fills, or patterns within the shapes) constitute in whole or in part one or more micro-features of touch sensor array 12. In an embodiment, one or more macro-features of a touch sensor array 12 determine one or more characteristics of its functionality, and one or more micro-features of touch sensor array 12 determine one or more optical features of touch sensor array 12, such as transmittance, refraction, or reflection.

Although this disclosure describes a number of example electrodes, the present disclosure is not limited to these example electrodes and other electrodes can be implemented. Additionally, although this disclosure describes a number of example embodiments that include particular configurations of particular electrodes forming particular nodes, the present disclosure is not limited to these example embodiments and other configurations can be implemented. In one embodiment, a number of electrodes are disposed on the same or different surfaces of the same substrate. Additionally or alternatively, different electrodes may be disposed on different substrates. Although this disclosure describes a number of example embodiments that include particular electrodes arranged in specific, example patterns, the present disclosure is not limited to these example patterns and other electrode patterns can be implemented.

A mechanical stack may contain the substrate (or multiple substrates) and the conductive material forming the electrodes for touch sensor array 12. In an embodiment, one or more portions of the substrate of touch sensor array 12 is made of polyethylene terephthalate (PET) or another material such as colorless polyimide (CPI), cyclo olefin polymer (COP). This disclosure contemplates any substrate with portions made of any material(s). As an example and not by way of limitation, the mechanical stack may include a first layer of optically clear adhesive (OCA) beneath a cover panel. The cover panel may be transparent and made of a resilient material suitable for repeated touching, such as for example glass, polycarbonate, or poly(methyl methacrylate) (PMMA). This disclosure may contemplate a cover panel being made of any clear, or substantially clear, material. As an alternative, a coating of transparent and hard (e.g., scratch resistant) material (e.g., CPI) may be applied to the substrate with the conductive material forming the electrodes instead of the first layer of OCA and the cover panel to form the touch surface itself for touch sensor array 12. The first layer of OCA may be disposed between the cover panel and the substrate with the conductive material forming the electrodes. The mechanical stack may also include a second layer of OCA and a dielectric layer (which is made of PET or another material, similar to the substrate with the conductive material forming the electrodes). As an alternative, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap above a display layer of a device including touch sensor array 12 and touch sensor controller 13. For example, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates other mechanical stacks (such as in-cell, on-cell types of touch sensor structure, etc.) with any number of layers made of any materials and having any thicknesses. For example, in one embodiment, a layer of adhesive or dielectric replaces the dielectric layer, second layer of OCA, and air gap described above, with there being no air gap in the mechanical stack.

Touch sensor array 12 may implement a capacitive form of touch sensing. In a mutual-capacitance implementation, touch sensor array 12 may include an array of drive and sense electrodes forming an array of capacitive nodes. A drive electrode and a sense electrode may form a capacitive node. The drive and sense electrodes forming the capacitive nodes may come near each other, but not make electrical contact with each other. Instead, the drive and sense electrodes may be capacitively coupled to each other across a space between them. A pulsed or alternating voltage applied to the drive electrode (by a touch-sensor controller 13) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 13 may measure the change in capacitance. By measuring changes in capacitance throughout the array, touch-sensor controller 13 may determine the position of the touch or proximity within the touch-sensitive area of touch sensor array 12. In a self-capacitance implementation, touch sensor array 12 may include an array of electrodes of a single type that may each form a capacitive node. When an object touches or comes within proximity of the capacitive node, a change in self-capacitance may occur at the capacitive node and touch-sensor controller 13 may measure the change in capacitance, for example, as a change in the amount of charge implemented to raise the voltage at the capacitive node by a pre-determined amount. As with a mutual-capacitance implementation, by measuring changes in capacitance throughout the array, touch-sensor controller 13 may determine the position of the touch or proximity within the touch-sensitive area(s) of touch sensor array 12. This disclosure contemplates any suitable form of capacitive touch sensing, where appropriate.

In particular embodiments, drive electrodes may run horizontally or vertically or in any suitable orientation. Similarly, sense electrodes may run horizontally or vertically or in any suitable orientation. In particular embodiments, drive electrodes may run substantially perpendicular to sense electrodes.

Touch sensor array 12 may include drive and sense electrodes disposed in a pattern on one side of a single substrate. In such a configuration, a pair of drive and sense electrodes capacitively coupled to each other across a space between them may form a capacitive node. As an example self-capacitance implementation, electrodes of a single type are disposed in a pattern on a single substrate. As an alternative, touch sensor array 12 may have drive electrodes disposed in a pattern on one side of a substrate and sense electrodes disposed in a pattern on another side of the substrate. Moreover, touch sensor array 12 may have drive electrodes disposed in a pattern on one side of one substrate and sense electrodes disposed in a pattern on one side of another substrate. In such configurations, an intersection of a drive electrode and a sense electrode forms a capacitive node. Such an intersection is a position where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates other configurations of electrodes forming nodes. Moreover, this disclosure contemplates other electrodes disposed on any number of substrates in any patterns.

As described above, in an embodiment, a change in capacitance at a capacitive node of touch sensor array 12 indicates a touch or proximity input at the position of the capacitive node. Touch-sensor controller 13 may detect and process the change in capacitance to determine the presence and position of the touch or proximity input. Touch-sensor controller 13 may then communicate information about the touch or proximity input to one or more other components (such one or more central processing units (CPUs) or digital signal processors (DSPs)) of a display device that includes touch sensor 10, which may respond to the touch or proximity input by initiating a function of the display device (or an application running on the display device) associated with it. Although this disclosure describes a particular touch sensor controller 13 having particular functionality with respect to a particular device and a particular touch sensor 10, this disclosure contemplates other touch sensor controllers having any functionality with respect to any device and any touch sensor.

In one embodiment, touch sensor controller 13 may be implemented as one or more integrated circuits (ICs), such as for example general-purpose microprocessors, microcontrollers, programmable logic devices or arrays, application-specific ICs (ASICs). Touch sensor controller 13 may include any combination of analog circuitry, digital logic, and digital non-volatile memory. In one embodiment, touch sensor controller 13 may be disposed on a flexible printed circuit (FPC) bonded to the substrate of touch sensor array 12, as described below. The FPC may be active or passive. In one embodiment, multiple touch sensor controllers 13 may be disposed on the FPC.

In an example implementation, touch sensor controller 13 may include a processor unit, a drive unit, a sense unit, and a storage unit. In such an implementation, the drive unit may supply drive signals to the drive electrodes of touch sensor array 12, and the sense unit may sense charge at the capacitive nodes of touch sensor array 12 and provide measurement signals to the processor unit representing capacitances at the capacitive nodes. The processor unit may control the supply of drive signals to the drive electrodes by the drive unit and process measurement signals from the sense unit to detect and process the presence and position of a touch or proximity input within touch-sensitive areas of touch sensor array 12. In an embodiment, the processor unit may also track changes in the position of a touch or proximity input within touch-sensitive areas of touch sensor array 12. The storage unit may store programming for execution by the processor unit, including programming for controlling the drive unit to supply drive signals to the drive electrodes, programming for processing measurement signals from the sense unit, and other programming. Although this disclosure describes a particular touch sensor controller 13 having a particular implementation with particular components, this disclosure contemplates touch sensor controller having other implementations with other components.

Tracks 14 of conductive material disposed on the substrate of touch sensor array 12 may couple the drive or sense electrodes of touch sensor array 12 to connection pads 16, also disposed on the substrate of touch sensor array 12. As described below, connection pads 16 may facilitate coupling of tracks 14 to touch-sensor controller 13. Tracks 14 may extend into or around (e.g. at the edges of) the touch-sensitive area(s) of touch sensor array 12. Particular tracks 14 may provide drive connections for coupling touch-sensor controller 13 to drive electrodes of touch sensor array 12, through which touch-sensor controller 13 may supply drive signals to the drive electrodes. Other tracks 14 may provide sense connections for coupling touch-sensor controller 13 to sense electrodes of touch sensor array 12, through which touch-sensor controller 13 may sense charge at the capacitive nodes of touch sensor array 12.

Tracks 14 may be made of fine lines of metal or other conductive material. For example, the conductive material of tracks 14 may be copper or copper-based and have a width of approximately 100 μm or less. As another example, the conductive material of tracks 14 may be silver or silver-based and have a width of approximately 100 μm or less. In one embodiment, tracks 14 may be made of ITO in whole or in part in addition or as an alternative to the fine lines of metal or other conductive material. Although this disclosure describes particular tracks made of particular materials with particular widths, this disclosure contemplates tracks made of other materials and/or other widths. In addition to tracks 14, in an embodiment, touch sensor array 12 may include one or more ground lines terminating at a ground connector (which can be a connection pad 16) at an edge of the substrate of touch sensor array 12 (similar to tracks 14).

Connection pads 16 may be located along one or more edges of the substrate, outside the touch-sensitive area(s) of touch sensor array 12. As described above, in an embodiment, touch sensor controller 13 may be on an FPC. Connection pads 16 may be made of the same material as tracks 14 and bonded to the FPC using an anisotropic conductive film (ACF). Connection 18 may include conductive lines on the FPC coupling touch-sensor controller 13 to connection pads 16, in turn coupling touch-sensor controller 13 to tracks 14 and to the electrodes of touch sensor array 12. Connection pads 16 may be connected to an electro-mechanical connector (such as, for example, a zero insertion force wire-to-board connector). Connection 18 may include an FPC. This disclosure contemplates any suitable connection 18 between touch-sensor controller 13 and touch sensor array 12.

In particular embodiments, touch sensor array 12 may have a multi-layer configuration, with drive electrodes disposed in a pattern on one side of a substrate and sense electrodes disposed in a pattern on another side of the substrate. Particular embodiments and examples of multi-layer configurations of drive and sense electrodes will be discussed further with respect to FIG. 1B.

Figure 1B:
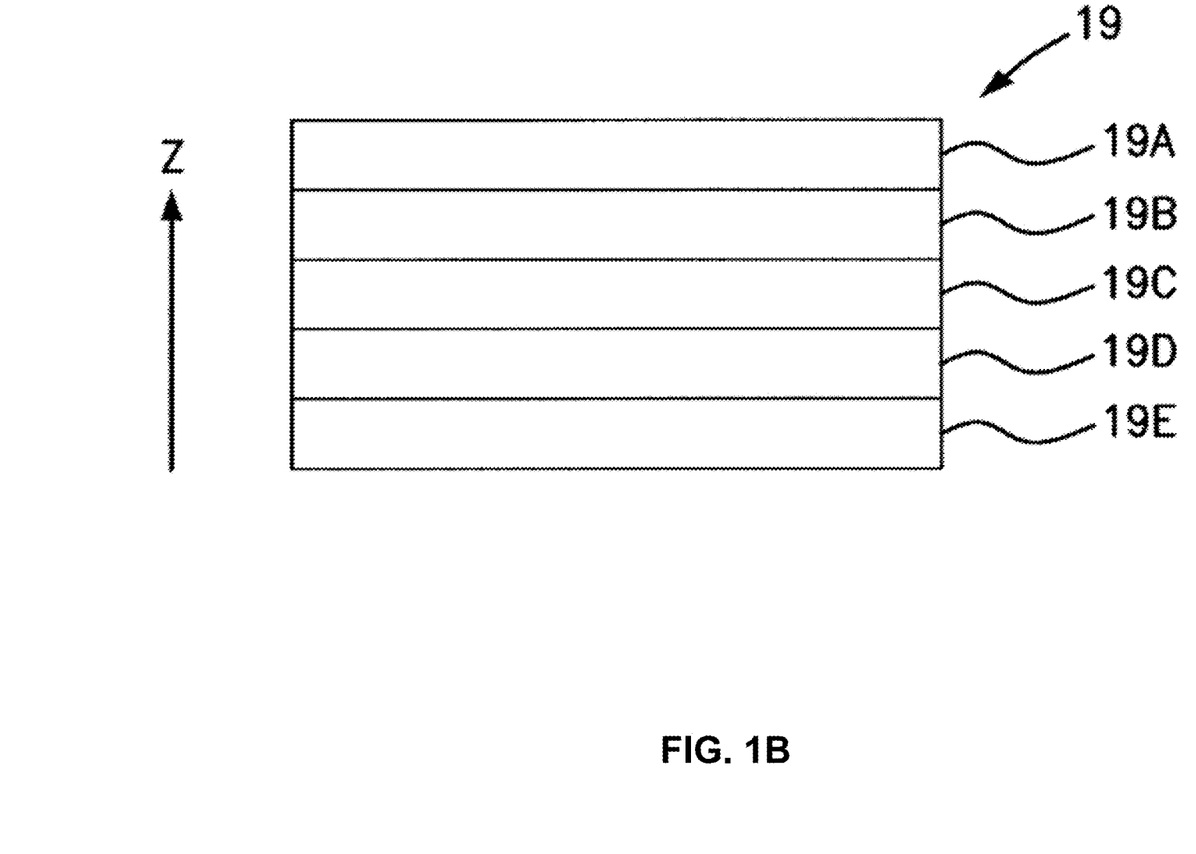
FIG. 1B illustrates an example mechanical stack for a touch sensor in accordance with particular embodiments.

FIG. 1B illustrates an example mechanical stack 19 for a touch sensor 10 in accordance with particular embodiments. In the example embodiment of FIG. 1B, the mechanical stack 19 includes multiple layers and is illustrated as stacked with respect to a z-axis. The example mechanical stack 19 includes a display layer 19E (e.g., including the example pixel array 20 with a Delta arrangement of subpixels which will be described later in detail with reference to FIG. 2), a second conductive layer 19D, a substrate 19C, a first conductive layer 19B, and a cover layer 19A. In an embodiment, the second conductive layer 19D and first conductive layer 19B may be drive and sense electrodes respectively, or may be sense and drive electrodes respectively, as discussed above in connection with FIG. 1A. In an embodiment, the second conductive layer 19D and first conductive layer 19B are meshes, for example, formed by conductive lines as described later in detail. Substrate 19C includes, in an embodiment, a material which electrically isolates the first and second conductive layers. In an embodiment, substrate 19C provides mechanical support for other layers. In an embodiment, additional layers of substrate (which, for example, may not be the same material as substrate 19C) may be used in different configurations. For example, a second substrate layer may be located between second conductive layer 19D and display array 19E. The display array 19E provides display information to be viewed by a user. Cover layer 19A may be clear, or substantially clear, and made of a resilient material for repeated touching, such as for example glass, polycarbonate, or poly(methyl methacrylate) (PMMA). In an embodiment, a transparent or semi-transparent adhesive layer is placed between cover layer 19A and first conductive layer 19B, and/or between second conductive layer 19D and display 19E. A user may interact with touch sensor 10 by touching cover layer 19A using a finger or some other touch object (such as a stylus). A user may also interact with touch sensor 10 by hovering a finger or some other touch object over cover layer 19A without actually making physical contact with cover layer 19A. In the example embodiment of FIG. 1B, mechanical stack 19 comprises two conductive layers forming, for example, a dual-layer mesh. In an embodiment, mechanical stack 19 may comprise a single conductive layer forming, for example, a single-layer mesh, formed by conductive lines as described later in detail. Other embodiments of mechanical stack 19 may implement other configurations, relations, and perspectives, as well as fewer or additional layers.

In an embodiment, mechanical stack 19 comprises a combination of conductive mesh and ITO layers, where, for example, one of first conductive layer 19B and second conductive layer 19D is a conductive mesh, and the other is ITO. In this embodiment, the conductive mesh layer acts as a single-layer mesh, and, in an embodiment, the ITO layer may transmit and/or receive signals. In this embodiment, only one layer, for example the conductive mesh layer, may be formed by the conductive lines arranged according to this disclosure (as discussed later in more detail).

Figure 2:
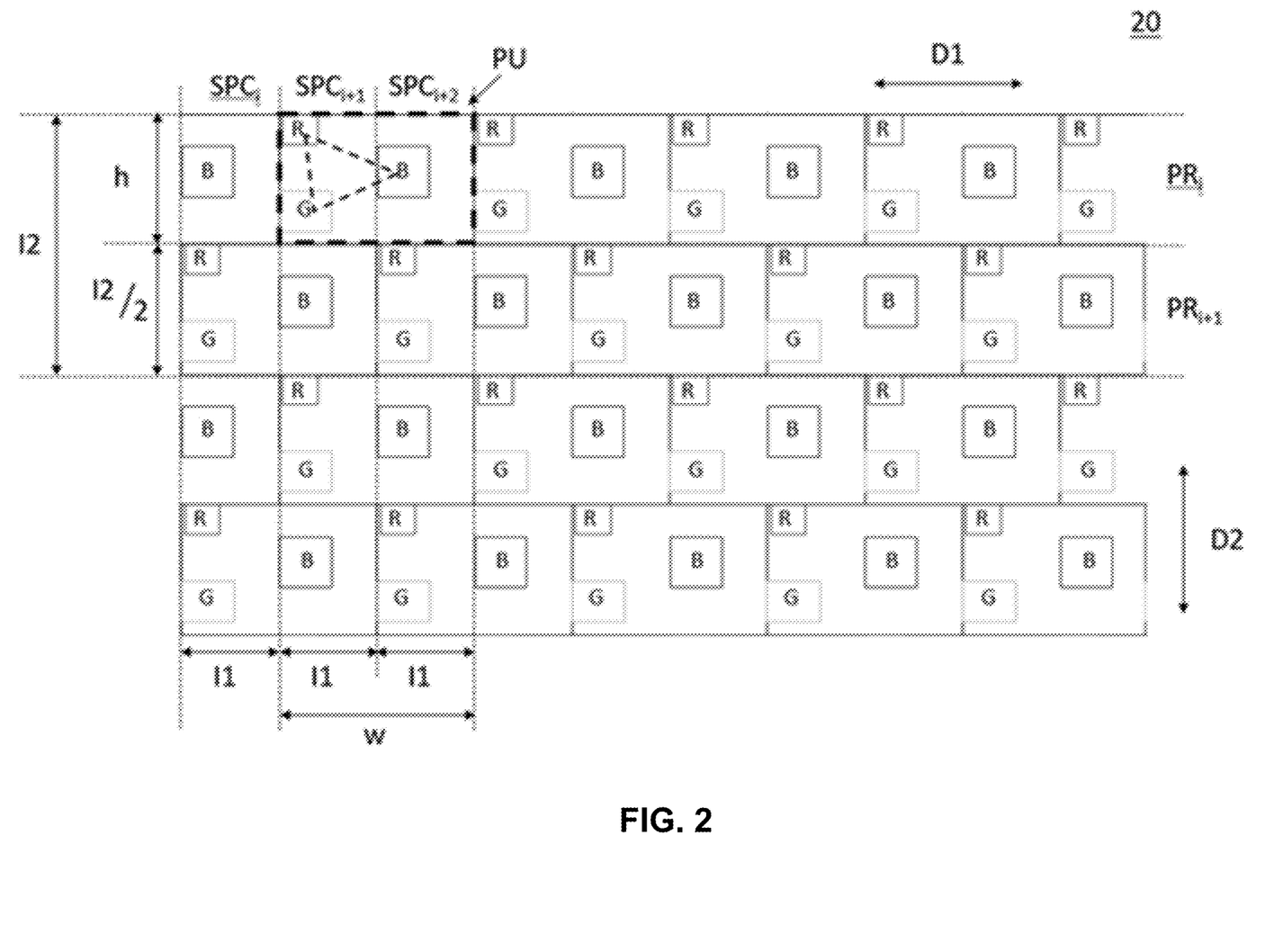
FIG. 2 illustrates an example portion of an example pixel array with a Delta arrangement of subpixels in accordance with particular embodiments.

FIG. 2 illustrates an example portion of an exemplary pixel array 20 with a Delta arrangement of subpixels in accordance with particular embodiments. In one embodiment, a touch sensor 10 is overlaid on the pixel array 20 to implement a touch-sensitive display device. As an example, the pixel array 20 underneath the touch sensor 10 may be configured to implement a liquid crystal display (LCD), a light-emitting diode (LED) display, an organic LED display, an LED backlight LCD, an electrophoretic display, a plasma display, or other display. Although this disclosure describes and illustrates particular display types, this disclosure contemplates any other display types.

In the example of FIG. 2, a portion of pixel array 20 includes a plurality of subpixel units consisting of first, second and third subpixel units respectively corresponding to three different colors, i.e., red subpixel units R, green subpixel units G and blue subpixel units B. For example, each subpixel unit is configured to emit light having a wavelength associated with a particular color among red, green and blue. Each subpixel unit may include one subpixel or two subpixels disposed adjacent to each other therein. For example, each green subpixel unit G may include two green subpixels disposed adjacent to each other. Red subpixel unit R, green subpixel unit G and blue subpixel unit B have different sizes from each other, for example, red subpixel unit R is the smallest, blue subpixel unit B is largest, and green subpixel unit G is larger than red subpixel unit R and smaller than blue subpixel unit B. Each subpixel unit has a substantially rectangular shape. Although this disclosure describes and illustrates example subpixel units corresponding to three particular colors and having particular relative sizes and shapes, this disclosure contemplates subpixel units corresponding to other three colors (i.e., at least one of which is different from the three particular colors of this disclosure) and having other relative sizes and other shapes.

The subpixel units R, G and B are substantially arranged into a plurality of subpixel columns (for example, $SPC_i$, $SPC_{i+1}$, $SPC_{i+2}$, etc.) extending along direction D2. For example, in each subpixel column, subpixel units are approximately left aligned along vertical direction D2. Subpixel columns are arranged at interval I1 in direction D1 perpendicular to direction D2. For example, interval I1 is defined as the distance along horizontal direction D1 between the left edges of any two respective subpixel units corresponding to the same color (such as red subpixels R, green subpixels G or blue subpixels B) in any two adjacent subpixel columns (for example, $SPC_i$ and $SPC_{i+1}$, or $SPC_{i+1}$ and $SPC_{i+2}$). Each subpixel column has a repeating pattern in an order of red subpixel R, green subpixel G and blue subpixel B at interval I2. For example, interval I2 is defined as the distance along vertical direction D2 between the upper edges of any two closest subpixel units corresponding to the same color (such as red subpixels R, green subpixels G or blue subpixels B) in any subpixel column (for example, $SPC_i$, $SPC_{i+1}$, or $SPC_{i+2}$). Each subpixel column is misaligned with respect to each adjacent subpixel column by half the interval I2 in direction D2. For example, the distance along vertical direction D2 between the upper edges of any two closest respective subpixel units corresponding to the same color (such as red subpixels R, green subpixels G or blue subpixels B) in any two adjacent subpixel columns (for example, $SPC_i$ and $SPC_{i+1}$, or $SPC_{i+1}$ and $SPC_{i+2}$) is equal to half the interval I2. Although this disclosure describes and illustrates subpixel units having a particular alignment manner and a particular order of repeating pattern in columns having particular orientations, this disclosure contemplates subpixel units having other alignment manners (e.g., substantially center aligned or right aligned) and other orders of repeating pattern (e.g., an order of red subpixel R, blue subpixel B and green subpixel G) in rows (or lines) having other orientations (e.g., any directions D1 and D2 perpendicular to each other).

Due to the distinct layout of a Delta arrangement of subpixels as described above, pixel array 20 may be typically configured to form a plurality of pixel units (e.g., PU indicated by dashed line) arranged into a plurality of pixel unit rows (e.g., $PR_i$, $PR_{i+1}$) extending along direction D1, where each pixel unit is defined with one red subpixel R, one green subpixel G and one blue subpixel B respectively located three vertices of a triangle therein and shaped as a rectangle having two dimensions w and h that are twice the interval I1 and half the interval I2 respectively in directions D1 and D2. Although this disclosure describes and illustrates a particular outline of pixel unit (e.g., PU) with the subpixel units R, G and B therein, this disclosure contemplates other outlines of pixel unit with the subpixel units R, G and B therein, as long as having at least one dimension w of twice the interval I1 in direction D1.

As a result of pixel array 20 as described above, as can be seen from FIG. 2, each pixel unit row (e.g., $PR_i$ or $PR_{i+1}$) is misaligned with respect to each adjacent pixel unit row (e.g., $PR_{i+1}$ or PR) by interval I1 (i.e., half the dimension w) in direction D1, that is, odd rows of pixel units are aligned to each other with respect to direction D1 and even rows of pixel units are also aligned to each other with respect to direction D1, while there is an offset equal to half the dimension w of pixel unit (i.e., interval I1) along direction D1 between odd rows of pixel units and even rows of pixel units as a whole. In this regard, due to such a offset between odd rows of pixel units and even rows of pixel units according to a Delta arrangement of subpixels, a touch sensor mesh pattern overlayed thereon, especially parallel conductive lines occlude odd rows of pixel units and even rows of pixel units, particularly in terms of subpixel units, to quite different extents and thus a Delta arrangement of subpixels is quite susceptible to a moiré pattern effect caused by a mesh pattern. The inventors of the present disclosure have recognized such a characteristic or problem of a Delta arrangement of subpixels and thus herein proposes improvements and optimizations, described below in detail, of mesh pattern for forming electrodes in touch sensor 10 by taking into account this characteristic or problem in order to mitigate moiré generated by the interaction of the mesh pattern with a Delta arrangement of subpixels.

In one aspect of the present disclosure, touch sensor 10 includes at least one layer of electrodes including a first group of conductive lines and a second group of conductive lines, the first group of conductive lines extending parallelly along a third direction oblique to direction D1 by a first acute angle and a second group of conductive lines extending parallelly along a fourth direction oblique to direction D1 by a second acute angle, and one of the third direction and the fourth direction inclined clockwise from direction D1 and the other inclined counterclockwise from direction D1. In an embodiment, touch sensor 10 includes two layers of electrodes (e.g., drive electrodes and sense electrodes) having respective mesh patterns each formed by a part of the first group of conductive lines and a part of the second group of conductive lines together. As an alternative, touch sensor 10 includes one layer of electrodes (e.g., for self-capacitive implementation) having a single mesh pattern formed by the first group of conductive lines and the second group of conductive lines.

In certain embodiments, the first group of conductive lines may comprise first conductive lines and second conductive lines arranged alternately, the first conductive lines arranged at a same first pitch along direction D1 as the second conductive lines and deviated from the second conductive lines by a first offset in direction D1, with the first offset defined as follows:

$$O1 = (2a-1)*I1 + \frac{I2}{2}*\cot A1,$$

wherein O1 denotes the first offset, a denotes an integer greater than 0, I1 denotes interval I1, I2 denotes interval I2, and A1 denotes the first acute angle.

The first offset as defined above enables the first conductive lines to occlude the odd rows of pixel units to substantially the same extent as the second conductive lines occlude the even rows of pixel units over pixel array 20, especially in terms of subpixel units, and vice versa, which can efficiently mitigate the moiré pattern effect generated due to the difference in occlusion levels of the odd and even rows of pixel units.

In particular embodiments, a may be selected from 1, 2 and 3.

In particular embodiments, the first pitch may be defined as follows:

$$P1 = 2b*I1 + I2*\cot A1,$$

wherein P1 denotes the first pitch, and b denotes an integer greater than 0 but not less than a.

The first pitch as defined above enables either of the first conductive lines and the second conductive lines to occlude each odd row of pixel units to substantially the same extent and occlude each even row of pixel units to substantially the same extent, which can also efficiently mitigate the moiré pattern effect generated due to the uneven occlusion in either of the odd and even rows of pixel units.

In particular embodiments, b may be selected from 2 and 4.

In particular embodiments, the first acute angle may be defined as follows:

$$A1 = \tan^{-1}\left(c*\frac{I2}{I1}\right),$$

wherein c denotes a preset coefficient having a value selected from a group consisting of 1/10, 1/8, 1/6, 1/5, 3/14, 1/4, 5/18, 2/7, 3/10, 1/3, 5/14, 3/8, 2/3, 3/4, 5/6, 1 and 3/2.

The first acute angle as defined above enables either of the first conductive lines and the second conductive lines to each occlude subpixel units corresponding to each color (e.g., red, green and blue) over pixel array 20, which can also efficiently mitigate the moiré pattern effect generated due to the uneven occlusion of subpixels in terms of three colors.

Figure 3:
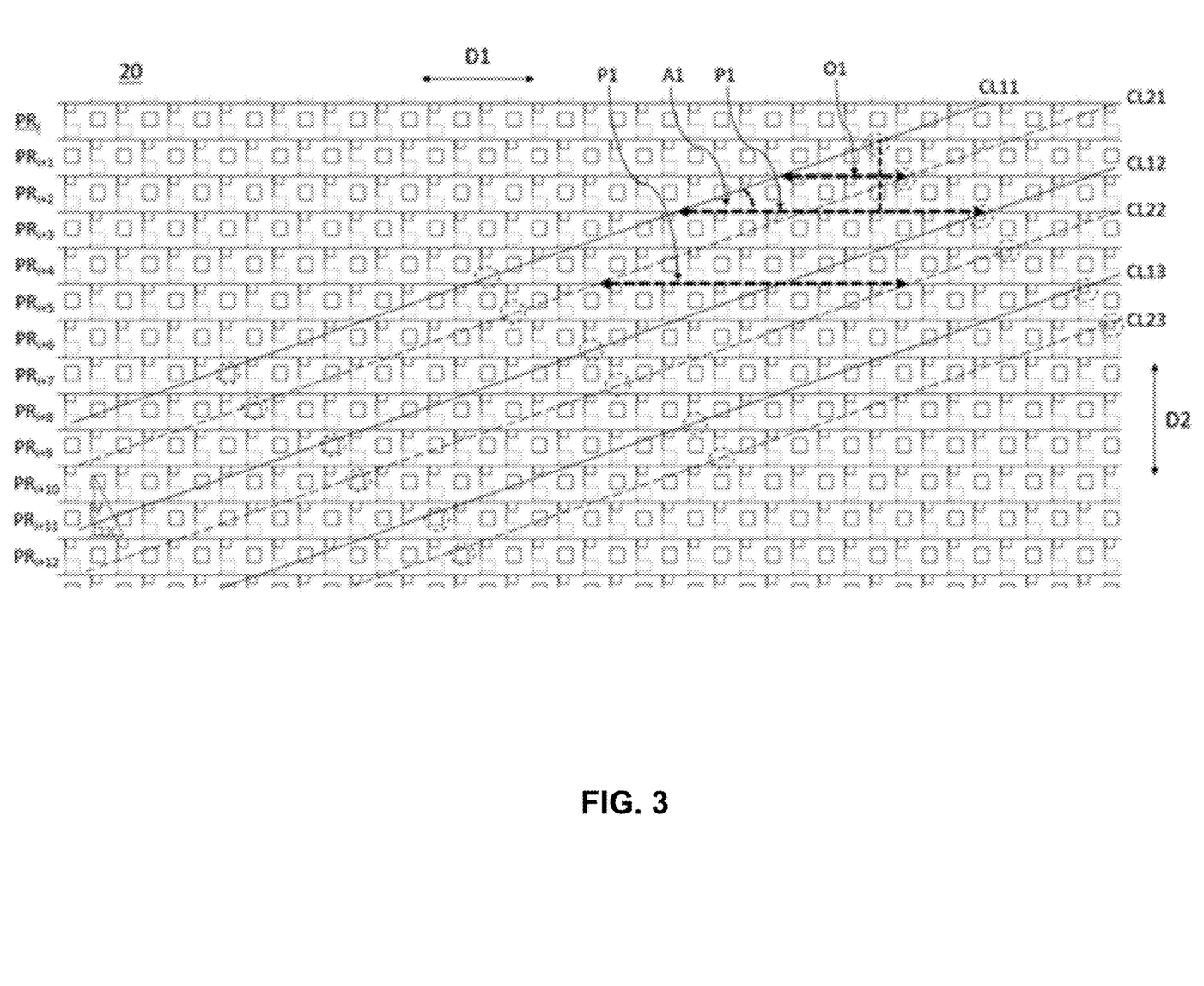
FIG. 3 illustrates a schematic top view of an example portion of an example pixel array with an example first group of conductive lines overlaid on the pixel array in accordance with particular embodiments.

FIG. 3 illustrates a schematic top view of an example portion of an example pixel array with an example first group of conductive lines overlaid on pixel array 20 in accordance with particular embodiments.

As shown in FIG. 3, the first group of conductive lines extends parallelly along a direction inclined counterclockwise from direction D1 by acute angle A1 and consists of first conductive lines CL11, CL12, CL13 and second conductive lines CL21, CL22, CL23 arranged alternately.

First conductive lines CL11, CL12, CL13 are arranged at pitch P1, second conductive lines CL21, CL22, CL23 are also arranged at pitch P1, with offset O1 between each first conductive line CL11, CL12 or CL13 and each adjacent second conductive line CL21, CL22 or CL23 along direction D1, where $$O1 = 1*I1 + \frac{I2}{2}*\cot A1, P1 = 4*I1 + I2*\cot A1, \text{ and}$$

$$A1 = \tan^{-1}\left(1/8*\frac{I2}{I1}\right).$$

In the example of FIG. 3, when first conductive line CL11 occludes a red subpixel (indicated by a dashed circle) in pixel unit row $PR_{i+1}$, a green subpixel (also indicated by a dashed circle) in pixel unit row $PR_{i+4}$, and a blue subpixel (also indicated by a dashed circle) in pixel unit row $PR_{i+7}$, adjacent second conductive line CL21 occludes another red subpixel (also indicated by a dashed circle) in pixel unit row $PR_{i+2}$, another green subpixel (also indicated by a dashed circle) in pixel unit row $PR_{i+5}$, and another blue subpixel (also indicated by a dashed circle) in pixel unit row $PR_{i+8}$ to substantially the same extent as first conductive line CL11, and first conductive line CL12 and adjacent second conductive line CL22, and first conductive line CL13 and adjacent second conductive line CL23 also show similar occlusions mutatis mutandis, thus it can be seen that first conductive lines CL11, CL12, CL13 occlude subpixels in the odd pixel unit rows to substantially the same extent conductive lines CL21, CL22, CL23 occlude subpixels in the even pixel unit rows over pixel array 200 taken as a whole, and vice versa.

Moreover, when first conductive line CL11 occludes a red subpixel in pixel unit row $PR_{i+1}$, a green subpixel in pixel unit row $PR_{i+4}$, and a blue subpixel in pixel unit row $PR_{i+7}$, next first conductive line CL12 occludes another red subpixel in pixel unit row $PR_{i+3}$, another green subpixel (also indicated by a dashed circle) in pixel unit row $PR_{i+6}$, and another blue subpixel (also indicated by a dashed circle) in pixel unit row $PR_{i+9}$ to substantially the same extent as first conductive line CL11, and another first conductive line CL13 occludes another red subpixel (also indicated by a dashed circle) in pixel unit row $PR_{i+5}$, another green subpixel (also indicated by a dashed circle) in pixel unit row $PR_{i+8}$, and another blue subpixel (also indicated by a dashed circle) in pixel unit row $PR_{i+11}$ to substantially the same extent as first conductive lines CL11 and CL12, and second conductive lines CL21, CL22, CL23 also show similar occlusions mutatis mutandis, thus it can be seen that either of first conductive lines CL11, CL12, CL13 and second conductive lines CL21, CL22, CL23 as a whole substantially evenly occlude subpixels in either of the odd pixel unit rows and the even pixel unit rows over pixel array 20 taken as a whole.

In addition, it also can be seen that each conductive line (e.g., either of each first conductive line CL11, CL12 or CL13 and each second conductive line CL21, CL22 or CL23) occludes red, green and blue subpixels over pixel array 20.

Although this disclosure describes and illustrates first group of conductive lines having a particular number of conductive lines and particular occlusions of particular subpixels, this disclosure contemplates other number of conductive lines and other occlusions of other subpixels. More specifically, although first group of conductive lines are described or illustrated above to have respective particular alignments or locations with respect to particular subpixel units or pixel units, those are for the purpose of illustration only, and this disclosure contemplates first group of conductive lines without any limitation to alignments or locations with respect to any subpixel unit or pixel unit, which still can effectively mitigate moiré generated by the interaction of the mesh pattern with a Delta arrangement of subpixels; although first group of conductive lines are described or illustrated above to have the first acute angle selected from particularly defined angles, this disclosure contemplates the first acute angle with a tolerance of plus or minus 1 degree allowed for the defined angles.

In particular embodiments, the second group of conductive lines may comprise third conductive lines and fourth conductive lines arranged alternately, the third conductive lines arranged at a same second pitch along direction D1 as the fourth conductive lines and deviated from the fourth conductive lines by a second offset in direction D1.

In particular embodiments, the second offset may be defined as follows:

$$O2 = (2d-1)*I1 + \frac{I2}{2}*\cot A2,$$

wherein O2 denotes the second offset, d denotes an integer greater than 0, and A2 denotes the second acute angle.

In particular embodiments, d may be selected from 1, 2 and 3.

In particular embodiments, the second pitch may be defined as follows:

$$P2=2e*I1+I2*\cot A2,$$

wherein P2 denotes the second pitch and e denotes an integer greater than 0 but not less than d.

In particular embodiments, e may be selected from 2 and 4.

In particular embodiments, the second acute angle may be defined as follows:

$$A2 = \tan^{-1}\left(f*\frac{I2}{I1}\right),$$

wherein f denotes a preset coefficient having a value selected from a group consisting of 1/10, 1/8, 1/6, 1/5, 3/14, 1/4, 5/18, 2/7, 3/10, 1/3, 5/14, 3/8, 2/3, 3/4, 5/6, 1 and 3/2.

For the advantages brought by the second offset, the second pitch and the second acute angle defined as above, references to those brought by the first offset, the first pitch and the first acute angle can be made.

Figure 4:
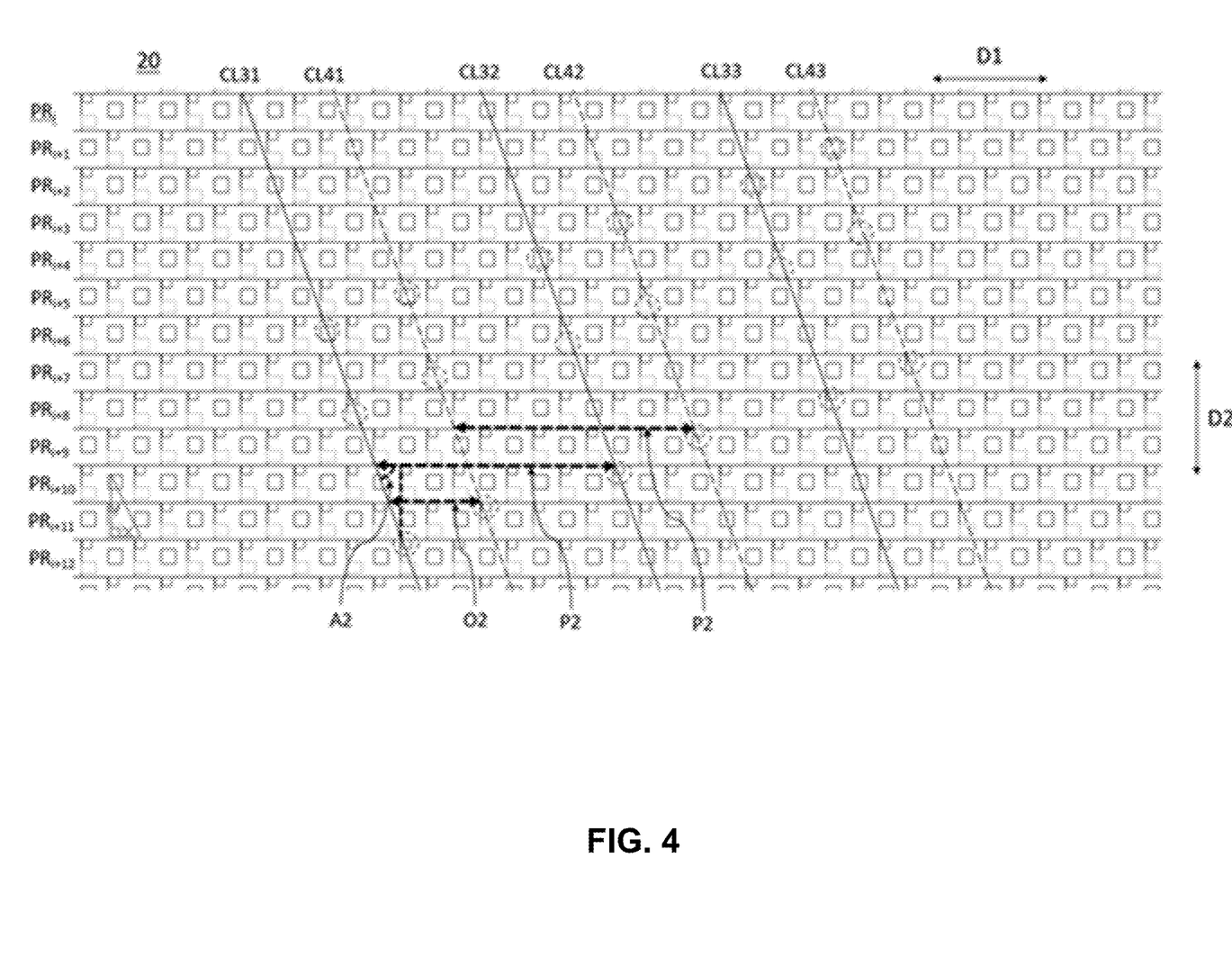
FIG. 4 illustrates a schematic top view of an example portion of an example pixel array with an example second group of conductive lines overlaid on the pixel array in accordance with particular embodiments.

FIG. 4 illustrates a schematic top view of an example portion of an example pixel array 20 with an example second group of conductive lines overlaid on pixel array 20 in accordance with particular embodiments.

As shown in FIG. 4, the second group of conductive lines extends parallelly along a direction inclined clockwise from direction D1 by acute angle A2 and consists of third conductive lines CL31, CL32, CL33 and fourth conductive lines CL41, CL42, CL43 arranged alternately.

Third conductive lines CL31, CL32, CL33 are arranged at pitch P2, fourth conductive lines CL41, CL42, CL43 are also arranged at pitch P2, with offset O2 between each third conductive line CL31, CL32 or CL33 and each adjacent fourth conductive line CL41, CL42 or CL43 along direction D1, where $$O2 = 3*I1 + \frac{I2}{2}*\cot A2, \; P2 = 8*I1 + I2*\cot A2, \text{ and}$$

$$A2 = \tan^{-1}\left(-\frac{I2}{I1}\right).$$

Although this disclosure describes and illustrates second group of conductive lines having a particular number of conductive lines and particular occlusions of particular subpixels, this disclosure contemplates other number of conductive lines and other occlusions of other subpixels. More specifically, although second group of conductive lines are described or illustrated above to have respective particular alignments or locations with respect to particular subpixel units or pixel units, those are for the purpose of illustration only, and this disclosure contemplates second group of conductive lines without any limitation to alignments or locations with respect to any subpixel unit or pixel unit, which still can effectively mitigate moiré generated by the interaction of the mesh pattern with a Delta arrangement of subpixels; although second group of conductive lines are described or illustrated above to have the second acute angle selected from particularly defined angles, this disclosure contemplates the second acute angle with a tolerance of plus or minus 1 degree allowed for the defined angles.

In particular embodiments, the touch sensor may comprise a first layer of electrodes and a second layer of electrodes, the first conductive lines and the third conductive lines forming a first mesh pattern for the electrodes on the first layer, and the second conductive lines and the fourth conductive lines forming a second mesh pattern for the electrodes on the second layer.

Figure 5:
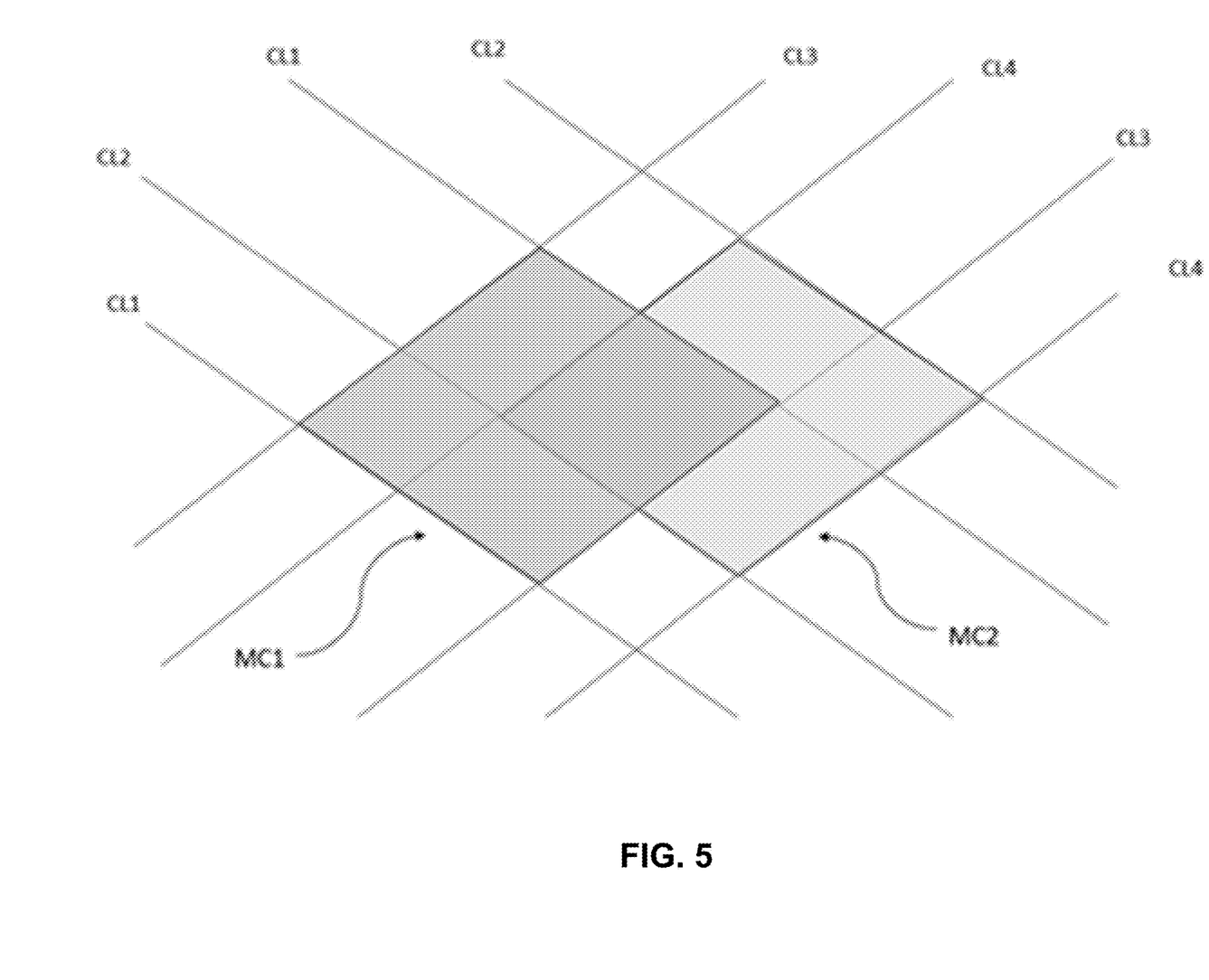
FIG. 5 illustrates a schematic top view of an example portion of an example touch sensor mesh design formed by example conductive lines in accordance with particular embodiments.

FIG. 5 illustrates a schematic top view of an example portion of an example touch sensor mesh design formed by example conductive lines in accordance with particular embodiments. In example of FIG. 5, first conductive lines CL1 and third conductive lines CL3 form a first mesh pattern composed of first mesh cells MC1 on a first layer of electrodes, and second conductive lines CL2 and fourth conductive lines CL4 form a second mesh pattern composed of second mesh cells MC2 on a second layer of electrodes.

Figure 6:
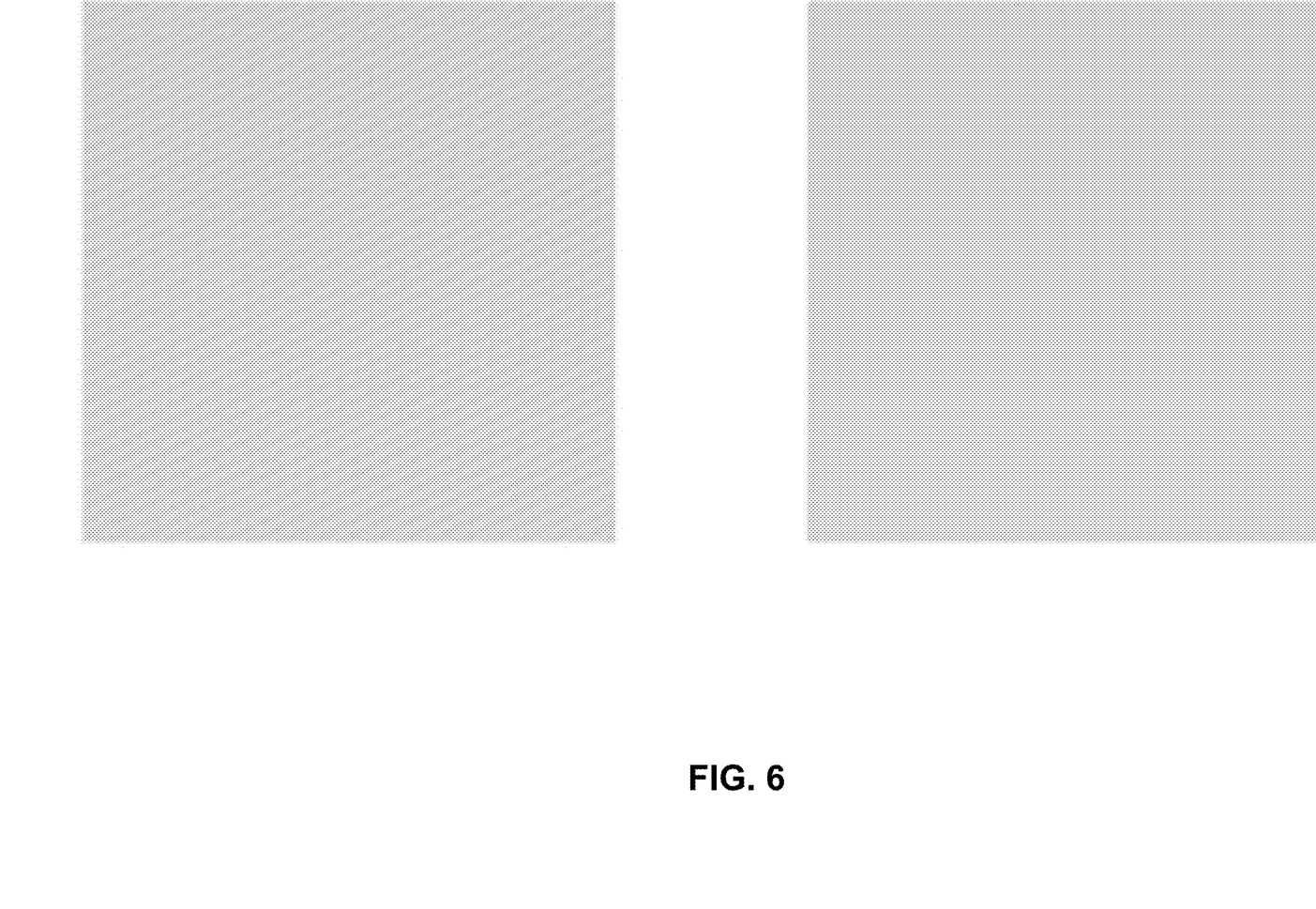
FIG. 6 illustrates example simulation results for moiré perceptibility evaluation in accordance with particular embodiments.

FIG. 6 illustrates simulation results for moiré perceptibility evaluation in accordance with particular embodiments. The inventors simulated two mesh patterns respectively overlaying the same pixel array with a Delta arrangement of subpixels, where one mesh pattern was designed as Example 1 according to the present disclosure, and the other mesh pattern was designed as Comparative example 1. Particularly, the mesh pattern of the Example 1 was formed by a first group of conductive lines and a second group of conductive lines, where the first group of conductive lines takes 3 as a for offset O1, 4 as b for pitch P1, and ¼ as c for angle A1, and the second group of conductive lines directly takes 3 times of interval I1 as offset O2, 6 times of interval I1 as pitch P2 and angle A1 as angle A2, while the mesh pattern of the Comparative example 1 was formed in the same configuration except for taking half the pitch P1 as offset O1. In FIG. 6, the image captured for the simulation result of mesh pattern of the Comparative example 1 is shown at the left and the image captured for the simulation result of mesh pattern of the Example 1 is shown at the right, from which it can be seen that a moiré pattern with high intensity is visually recognizable with the naked eyes in the left image corresponding to the Comparative example 1, while no moiré effect is visually recognizable with the naked eyes in the right image corresponding to the Example 1.

The invention claimed is:

1. A touch sensor for a display device, the display device comprising a pixel array on which the touch sensor is overlaid when viewed from a front side of the display device, the pixel array comprising a plurality of subpixel units substantially arranged into a plurality of subpixel rows arranged at a first interval in a first direction, wherein each subpixel row extends along a second direction perpendicular to the first direction to have an order of three subpixels of different colors repeated at a second interval, and every two adjacent subpixel rows are misaligned with respect to each other by half the second interval in the second direction, wherein the touch sensor comprises at least one layer of electrodes comprising a first group of conductive lines extending parallelly along a third direction oblique to the first direction by a first acute angle and a second group of conductive lines extending parallelly along a fourth direction oblique to the first direction by a second acute angle, with one of the third direction and the fourth direction inclined clockwise from the first direction and the other inclined counterclockwise from the first direction, wherein the first group of conductive lines comprises first conductive lines and second conductive lines arranged alternately, the first conductive lines arranged at a same first pitch along the first direction as the second conductive lines and deviated from the second conductive lines by a first offset in the first direction, with the first offset defined as follows:

$$O1 = (2a-1)*I1 + \frac{I2}{2}*\cot A1,$$

wherein O1 denotes the first offset, a denotes an integer greater than 0, I1 denotes the first interval, I2 denotes the second interval, and A1 denotes the first acute angle.

2. The touch sensor of claim 1, wherein the first pitch is defined as follows:

$$P1=2b*I1+I2*\cot A1,$$

wherein P1 denotes the first pitch, and b denotes an integer greater than 0 but not less than a.

3. The touch sensor of claim 1, wherein the first acute angle is defined as follows:

$$A1 = \tan^{-1}\left(c*\frac{I2}{I1}\right),$$

wherein c denotes a preset coefficient having a value selected from a group consisting of ⅒, ⅛, ⅙, ⅕, 3/14, ¼, 5/18, 2/7, 3/10, ⅓, 5/14, ⅜, ⅔, ¾, ⅚, 1 and 3/2.

4. The touch sensor of claim 1, wherein the second group of conductive lines comprises third conductive lines and fourth conductive lines arranged alternately, the third conductive lines arranged at a same second pitch along the first direction as the fourth conductive lines and deviated from the fourth conductive lines by a second offset in the first direction.

5. The touch sensor of claim 4, wherein the second offset is defined as follows:

$$O2 = (2d-1)*I1 + \frac{I2}{2}*\cot A2,$$

wherein O2 denotes the second offset, d denotes an integer greater than 0, and A2 denotes the second acute angle.

6. The touch sensor of claim 5, wherein the second pitch is defined as follows:

$$P2=2e*I1+I2*\cot A2,$$

wherein P2 denotes the second pitch and e denotes an integer greater than 0 but not less than d.

7. The touch sensor of claim 4, wherein the second acute angle is defined as follows:

$$A2 = \tan^{-1}\left(f*\frac{I2}{I1}\right),$$

wherein f denotes a preset coefficient having a value selected from a group consisting of ⅒, ⅛, ⅙, ⅕, 3/14, ¼, 5/18, 2/7, 3/10, ⅓, 5/14, ⅜, ⅔, ¾, ⅚, 1 and 3/2.

8. The touch sensor of claim 4, wherein the touch sensor comprises a first layer of electrodes and a second layer of electrodes, the first conductive lines and the third conductive lines forming a first mesh pattern for the electrodes on the first layer, and the second conductive lines and the fourth conductive lines forming a second mesh pattern for the electrodes on the second layer.

9. The touch sensor of claim 4, wherein the touch sensor comprises one layer of electrodes, the first group of conductive lines and the second group of conductive lines forming a single mesh pattern for the electrodes on the one layer.

10. A display device comprising a touch sensor of claim 1.

* * * * *